(12) United States Patent
Lewis et al.

(10) Patent No.: US 6,965,712 B1
(45) Date of Patent: Nov. 15, 2005

(54) LOW COST AMPLIFICATION IN DWDM NETWORKS

(75) Inventors: Stephen Lewis, Kanata (CA); Jowan Thomas, Carp (CA)

(73) Assignee: Nortel Networks Limited, (CA)

( * ) Notice: Subject to any disclaimer, the term of this patent is extended or adjusted under 35 U.S.C. 154(b) by 0 days.

(21) Appl. No.: 10/747,970

(22) Filed: Dec. 29, 2003

(51) Int. Cl.[7] .............................................. G02B 6/26
(52) U.S. Cl. ........................ 385/27; 385/14; 385/15; 385/39
(58) Field of Search ............................ 385/27, 14, 39, 385/15, 9, 5, 28; 359/124

(56) References Cited

U.S. PATENT DOCUMENTS

| | | | | |
|---|---|---|---|---|
| 6,243,176 B1 * | 6/2001 | Ishikawa et al. | ............ | 398/141 |
| 6,782,205 B2 * | 8/2004 | Trisnadi et al. | ............... | 398/94 |
| 6,833,946 B2 * | 12/2004 | Islam | ......................... | 359/334 |
| 2001/0026384 A1 * | 10/2001 | Sakano et al. | .............. | 359/124 |
| 2002/0196492 A1 * | 12/2002 | Trisnadi et al. | ............. | 359/124 |
| 2003/0123139 A1 * | 7/2003 | Terahara et al. | ......... | 359/341.3 |
| 2003/0210844 A1 * | 11/2003 | Kakui et al. | .................... | 385/4 |
| 2004/0109655 A1 * | 6/2004 | Dennis et al. | .............. | 385/123 |

* cited by examiner

*Primary Examiner*—Kianni C. Kaveh
(74) *Attorney, Agent, or Firm*—Steubing McGuinness & Manaras LLP

(57) ABSTRACT

An optical repeater is provided for use in an optical communication network wherein only wavelength ranges having desirable gain characteristics are used for communication. Selectively assigning channels to wavelengths having desirable gain characteristics for a given amplifier permits channels to be more closely spaced in the available frequency spectrum. Such an arrangement reduces the cost of optical communication systems by removing the need for gain flattening filters, while maintaining the ability of the network to support a desired number of communication channels.

10 Claims, 4 Drawing Sheets

LOW COST AMPLIFICATION IN DWDM NETWORKS

FIELD OF THE INVENTION

This invention is related to the field of optical transport systems and more particularly to the use of optical components in optical transport systems.

BACKGROUND OF THE INVENTION

As it is known in the art, optical communication is a technology that uses glass or plastic threads (fibers) to transmit data. A fiber optic cable consists of a bundle of glass threads, each of which is capable of transmitting messages modulated onto light waves. In Dense Wavelength Division Multiplexing (DWDM) communication, fiber optic bandwidth is increased by combining and transmitting multiple signals simultaneously at different wavelengths on the same fiber. In effect, one fiber is transformed into multiple virtual fibers.

Endpoints in an optical network communicate over assigned channels. A wavelength, or frequency, is allocated to each channel and signals are forwarded end to end over the channel. Each portion of the frequency spectrum is allocated to different bands of communication. For example, communications in the Conventional band (C-band) modulate data onto light waves in the wavelength range of 1525 nm to 1565 nm. In order to fully utilize the bandwidth potential of each band, it is desirable to map as many channels as possible onto the band. For example, in practice the C-band is apportioned into sixteen communication channels at 200 Ghz channel spacing.

The frequency spacing between wavelengths in a communication band is defined by the spectral width of the laser. On newer components, it is fairly cheap to lower the spacing between channels because lasers are better. When communication channels are more closely spaced, the communication capacity of the band is increased.

However, one problem with using the full communication capacity of a band arises due to the gain characteristics introduced by components as a wavelength traverses from a transmit point to a receive point in a network. As the signal propagates from end to end it encounters a number of components, each of which add different amounts of 'ripple', or change in power value to the wavelength. As a result, at the receive endpoint in the communication path there is a a ripple in power and, therefore the Optical Signal to Noise Ratio (OSNR) of the received signal. Different components have different output gain characteristics depending upon the frequency of the input signal to the component. For example, an amplifier may have a high gain characteristic for wavelengths in a certain range of the frequency band, and lower gain characteristic for wavelength in a different range of the frequency band. Thus, in systems that desire to use the entire band, gain flattening filters must used with amplifiers to remove the undesirable gain characteristics from the amplified signals. However, gain flattening filters are expensive and undesirably increase the overall cost of the network.

One alternative is to use techniques such as Coarse Wavelength Division Multiplexing (CWDM) systems, wherein a small number of channels are mapped across a frequency band. CWDM systems carry less communication channels, and are used when this is appropriate. Thereby reducing the cost of the optical network due to less filtering and loss from the components. However, CWDM systems do not utilize the full communication potential of the bandwidth, and do not lend well to amplification due to the spectral width of the receive filters. It would be desirable to identify a low cost method for utilizing multiple frequency channels in a communication band on an amplified network.

SUMMARY OF THE INVENTION

According to one aspect of the invention, an optical repeater is provided for use in an optical communication network wherein only wavelength ranges having desirable gain characteristics are used for communication. Allowing channels to be more closely spaced in the available frequency spectrum affords the ability to selectively assign channels to wavelengths having desirable gain characteristics for a given amplifier. Wavelengths that do not have desirable gain characteristics are not used. Such an arrangement reduces the cost of optical communication systems by removing the need for gain flattening filters, while maintaining the ability of the network to support a desired number of communication channels and still achieve an acceptable performance level.

According to another aspect of the invention, an N-channel optical repeater includes an amplifier for amplifying an input signal, wherein the wavelengths of N channels supported by the optical repeater are selected to reside in a spectral area that provides the best gain behavior of the amplifier.

According to a further aspect of the invention, a method of assigning wavelengths to channels for communication on an optical network including the steps of identifying, responsive to gain behavior characteristics of components to be used in the optical network, wavelengths having desirable gain characteristics; and mapping channels for communication of optical signals to wavelengths at which the components have desirable gain characteristics to reduce a gain ripple between the channels; and forwarding optical signals between end points on the mapped channels.

According to another aspect of the invention, an optical transport system includes a transmitter for transmitting an optical signals, the optical signal transmitted at a selected wavelength, an optical repeater including a component having a gain behavior for a spectral range of wavelengths; and means for selecting the selected wavelength for carrying the optical signals in response to the gain behavior of the component at the selected wavelength.

DETAILED DESCRIPTION

Figure 1:
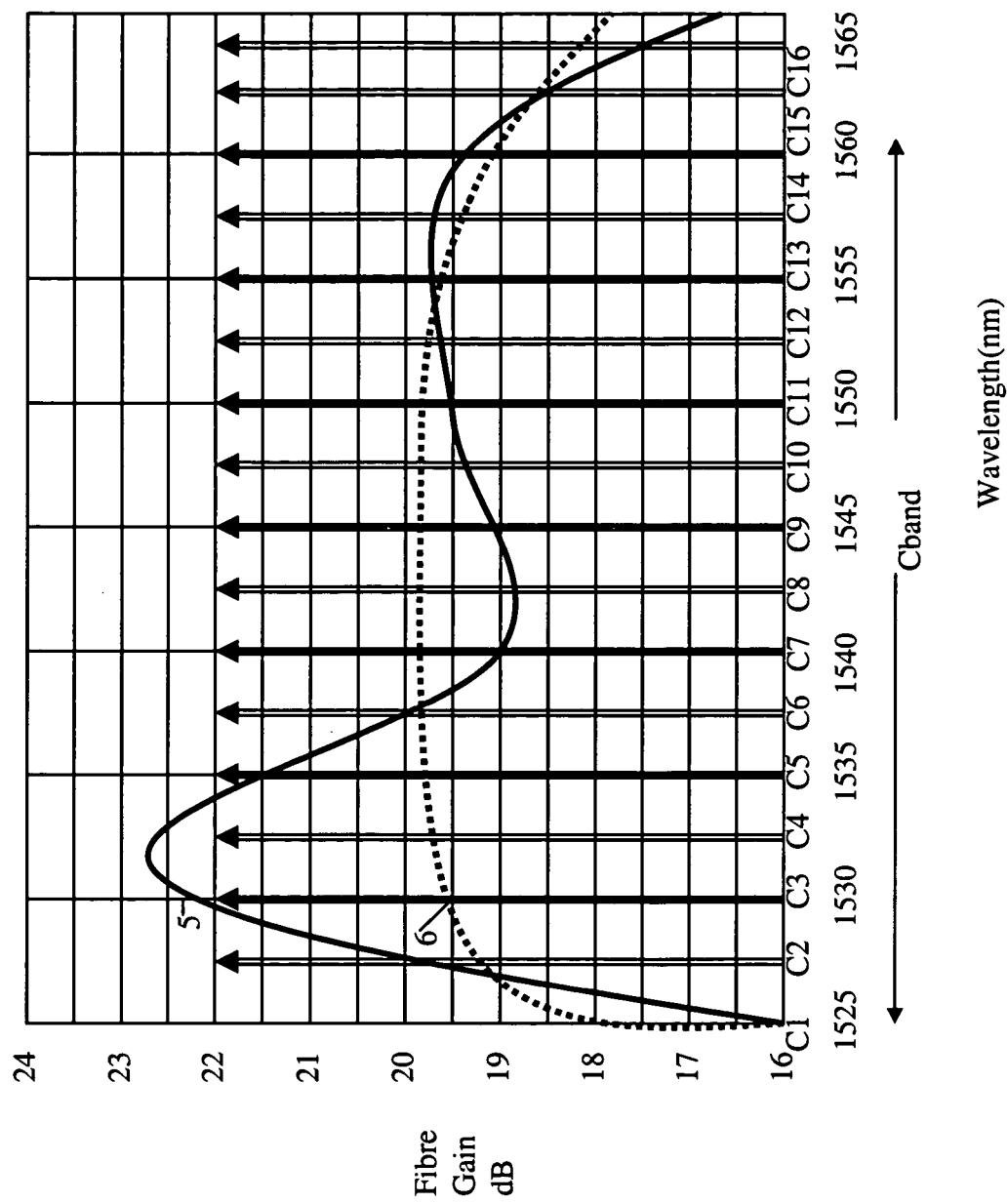
FIG. 1 illustrates a gain characteristic curve and exemplary channel mapping for an Ebrium-Doped Fiber Amplifier (EDFA)

Referring now to FIG. 1, in an exemplary prior art optical communication network, the wavelength spectrum is apportioned into a plurality of frequency bands. The wavelengths within the band are apportioned into a number of channels, each of which can be used to carry optical signals between end points in the optical networks. For example, in a Dense Wavelength Division Multiplex (DWDM) system, it is usual to have a number of channels communicate over a shared optical fiber. FIG. 1 illustrates a typical prior art DWDM channel mapping for transmission within the C-band frequency range. In FIG. 1, 16 channels are spaced at 200 Ghz intervals.

At various intervals in the optical communication path, the optical signals are re-conditioned to ensure that adequate Optical Signal to Noise Ratios (OSNRs) are met at a receiving end. One or more optical repeaters are inserted within the path, each optical repeater intended to strengthen the signal through a combination of amplification and gain flattening filtering. Each amplifier has different gain characteristics for each of the wavelengths. The graph in FIG. 1 illustrates a typical gain behavior curve 5 for an erbium-doped fiber amplifier (EDFA).

An EDFA is an optical repeater device that is used to boost the intensity of optical signals being carried through a fiber optic communications system. An optical fiber is doped with the earth element erbium so that the glass fiber can absorb light at one frequency and emit light at another frequency. An external semiconductor laser couples light into the fiber at infrared wavelengths of either 980 or 1480 nanometers. This action excites the erbium atoms. Additional optical signals at wavelengths between 1530 and 1620 nanometers enter the fiber and stimulate the excited erbium atoms to emit photons at the same wavelength as the incoming signal. This action amplifies a weak optical signal to a higher power, to boost the signal strength.

As shown in FIG. 1, the gains introduced by the EDFA differ for the various wavelength inputs. Thus, typically a gain flattening filter is applied to the output of the EDFA, providing a resultant signal 6. The prior art combination therefore provides a mechanism for supporting 16 communication channels in the C-band.

However, gain flattening filters are expensive thus it is much cheaper to provide an amplifier without a gain flattening filter. The present invention provides a mechanism for supporting 16 communication channels in the C-band without the use of gain flattening filters. Using the arrangement described below, 16 channels can easily be supported in a low cost DWDM network.

Figure 2:
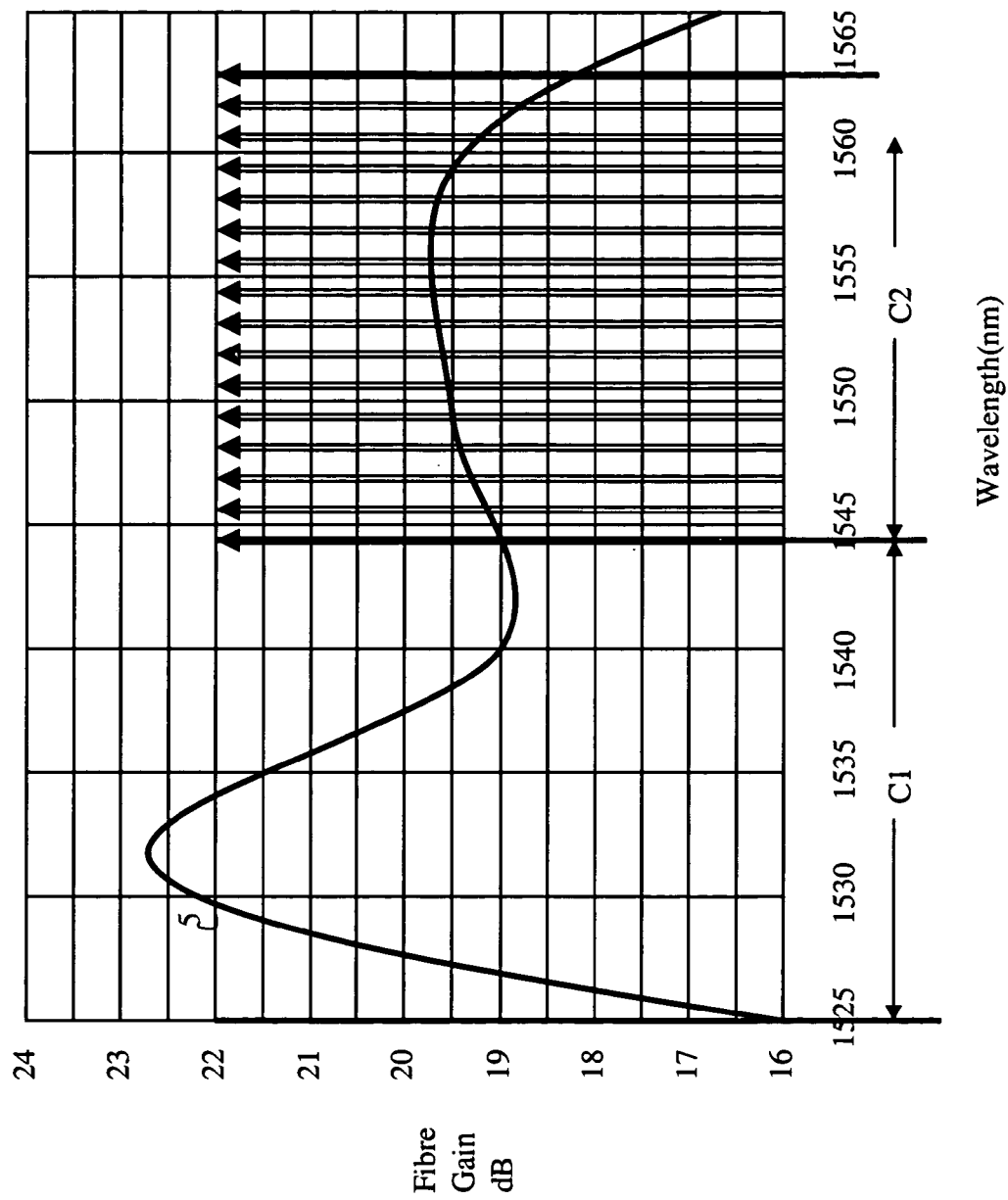
FIG. 2 illustrates a mapping of communication channels to only those spectral ranges of the EDFA having a desirable gain characteristic according to the present invention.

Referring now to FIG. 2, the present invention maps communication channels only to those wavelengths of the EDFA that are desirable, whereby desirable wavelengths are those wavelengths for which the EDFA incurs a relatively flat gain. Thus, in FIG. 2 the desirable wavelength are the wavelengths in the C2 band. In the embodiment of FIG. 2, only the spectral range of the amplifier having flat gain characteristics is used to map the channels. The same number of channels may be mapped to the C-band by more tightly spacing the communication channels within the desirable spectral range. Current technology can achieve the tight channel spacing with a relatively low cost laser, and thus the present invention allows a low cost amplifier to be used as an optical repeater in a transport network, yet still support a desired number of communication channels. For example, in FIG. 2, the 16 channels, previously spaced in the entire C-band at 200 Ghz spacing, may be spaced at a frequency interval of 100 Ghz in the C2 band. Selective placement of the channels within the available band allows for low cost repeaters to be used in an optical path to reduce the overall optical network cost.

Although FIG. 2 illustrates the provision of 16 channels with 100 Ghz spacing in the C band, it should be appreciated that the present invention may also be used to provide 32 channels at 50 Ghz, and, as technology advances, 64 channels at 25 Ghz spacing. In addition, although the present invention has been described with regard to C-band communication, it is equally applicable to any communication band, including Long wavelength Band (L-Band), or any alternative.

Figure 3:
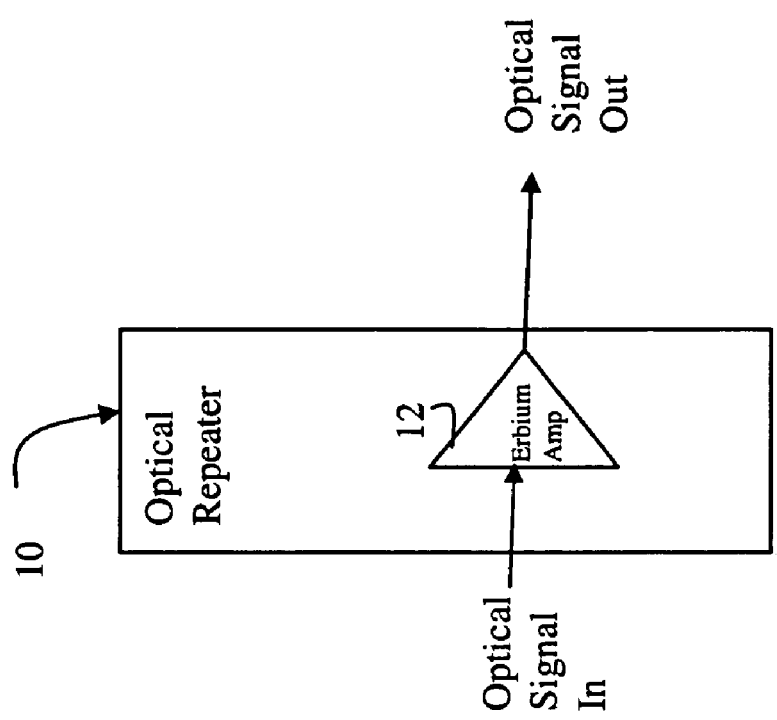
FIG. 3 illustrates an exemplary optical repeater of the present invention, without the inclusion of gain-flattening filters.

Referring now to FIG. 3, a diagram of an optical repeater 10 is shown to include merely an amplifier 12, which may be, for example, an EDFA, receiving an input optical signal. Other amplifiers, such as Linear Optical Amplifiers (LOAs) and Semiconductor Optical Amplifiers (SOAs) may alternatively be used herein, and it will be apparent that the present invention is not limited to any particular type of amplifier. Rather the concepts of the present invention may be used with any amplifier, where channels are mapped to spectral ranges of the amplifier that have desirable, or relatively flat, gain characteristics. The advantage of the optical repeater 10 over the prior art is that there is no need for the inclusion of a gain flattening filter in the repeater; rather, because channels are mapped merely to those portions of the spectral range of the amplifier that has desirable gain characteristics, low cost amplifiers may be used in the system. For amplifier types that do not require gain flattening filters (SOA, LOA) this invention will allow more channels to be carried on the amplifier by pushing them into flatter regions of the gain spectrum of those amplifiers.

Figure 4:
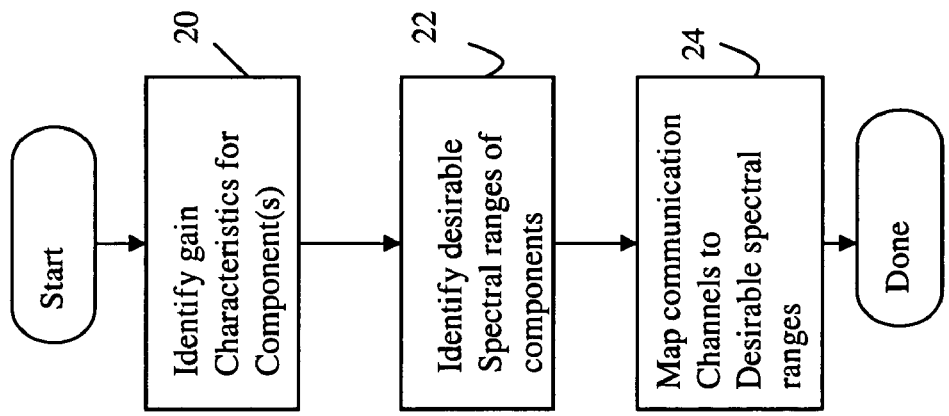
FIG. 4 illustrates an exemplary process for mapping channels to spectral ranges of a component having desirable gain characteristics according to the present invention.

Referring now to FIG. 4, a method for mapping channels to frequencies will now be described. At step 20, a gain characteristic curve for a component that is to be used in an optical transmission system is reviewed. At step 22, spectral ranges within the frequency band of the optical transmission system for which the component has desirable gain characteristics are identified. At step 24, N channels are mapped to the identified ranges. It should be noted that although FIG. 2 illustrates a contiguous range of desirable frequencies, it may be that other components have discontinuous ranges that are also desirable. The present invention envisions the use of any of the ranges that have desirable gain characteristics as being available for mapping of communication channels. Once the channels have been mapped, the process is complete.

It should be noted that although the process of FIG. 4 was discussed with regard to a gain characteristic curve for one component, the present invention may combine gain characteristic curves from various components that are used in the transport system to obtain an aggregate view of desirable frequencies, and thus the present invention is not limited to the use of merely on gain characteristic curve.

Thus, a low cost method and apparatus for repeating optical signals has been shown and described. Although the above embodiment has been described with regard to a certain range of wavelengths, it should be understood that the present invention may be equally applicable in any frequency band. In addition, although the embodiment has been described with regard to gain behavior characteristics of the EFDA, it is understood that the present invention is not limited to any particular component or device. Rather, the concept of the present invention of mapping communication channels to wavelengths that exhibit the least amount of ripple for the various components in the communication path may be used in a variety of applications, all of which are included in the spirit and scope of the invention.

Having described various methods and apparatus, it is understood that the present invention is not limited by the disclosed embodiment, but rather encompassed under the spirit and scope of the attached claims.

What is claimed is:

1. An N-channel optical repeater comprising:
   an amplifier for amplifying an input signal tuned to at least one of the N channels, wherein the wavelengths of N channels forwarded by the optical repeater are selected responsive to a gain behavior of the amplifier at the wavelengths of the N channels; a plurality of mapped channels for communication of optical signals only to wavelengths at which the amplifier has desirable gain characteristics.

2. The N-channel optical repeater of claim 1, wherein the amplifier is an Ebrium Doped Fiber Amplifier (EDFA).

3. The N-channel optical repeater of claim 1, wherein the amplifier is a Linear Optical Amplifier (LOA).

4. The N-channel optical repeater of claim 1, wherein the amplifier is a silicon optical amplifier (SOA).

5. The N-channel optical repeater of claim 1, wherein the N channels comprise wavelengths allocated to at least one communication band.

6. The N-channel optical repeater of claim 5, wherein frequencies of the N-channels are spaced at 100 Ghz intervals.

7. The N-channel optical repeater of claim 5, wherein frequencies of the N-channels are spaced at 50 Ghz intervals.

8. The N-channel optical repeater of claim 5, wherein the communication band is C-band.

9. The N-channel optical repeater of claim 5, wherein the communication band is L-band.

10. The N-channel optical repeater of claim 5 wherein the at least one communication band comprises C-band and L-band.

* * * * *